United States Patent [19]

Bale, Jr.

[11] 3,970,197

[45] July 20, 1976

[54] RACK AND BICYCLE LOCKING UNIT

[76] Inventor: Robert William Bale, Jr., 7305 Good Luck Road, New Carrolton, Md. 20784

[22] Filed: Nov. 5, 1974

[21] Appl. No.: 521,186

[52] U.S. Cl. .................................. 211/5; 70/38 C
[51] Int. Cl.² ....................................... E05B 73/00
[58] Field of Search ................... 211/17, 18, 19, 20, 211/21, 22, 23, 24, 5, 4, 7; 70/227, 234, 235, 18, 38 R, 38 C

[56] References Cited
UNITED STATES PATENTS

| 228,656 | 6/1880 | Loch | 70/38 C |
| 1,222,545 | 4/1917 | Gross | 70/38 C |
| 3,739,609 | 6/1973 | Kaufmann | 211/5 |
| 3,783,659 | 1/1974 | Rossi | 211/5 |
| 3,827,773 | 8/1974 | Aiello | 211/5 |
| 3,832,871 | 9/1974 | Kaufmann | 70/234 |
| 3,863,767 | 2/1975 | Garwood | 70/234 |
| 3,865,244 | 2/1975 | Galen | 211/24 |
| 3,865,245 | 2/1975 | Lieb et al. | 211/5 |
| 3,887,075 | 6/1975 | Harvey | 211/5 |

Primary Examiner—Roy D. Frazier
Assistant Examiner—Robert A. Hafer
Attorney, Agent, or Firm—Edwin E. Greigg

[57] ABSTRACT

A rack and locking unit for a bicycle includes a pedestal, a lock box mounted on the pedestal and at least one arm member mounted to the lock box and extending in a direction substantially perpendicular to the pedestal. The lock box has at least one locking bar structure mounted to it which is axially and pivotable displaceable relative to the lock box between a locked and unlocked position. Within the lock box there is provided a locking mechanism for each locking bar structure which is actuatable externally of the lock box, by, for example, a key. Preferably the locking bar structure receives a wheel and a portion of the frame of the bicycle to lock it to the unit. The arm member is in turn provided with a shaft which extends outwardly therefrom in the displacement direction of the locking bar structure. The arm member and shaft receive the other wheel of the bicycle and prevent its removal when the first mentioned wheel is locked in place.

11 Claims, 8 Drawing Figures

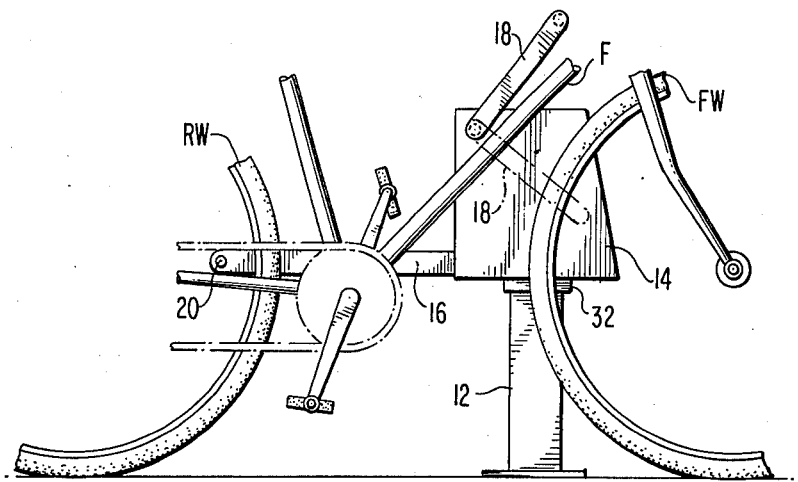
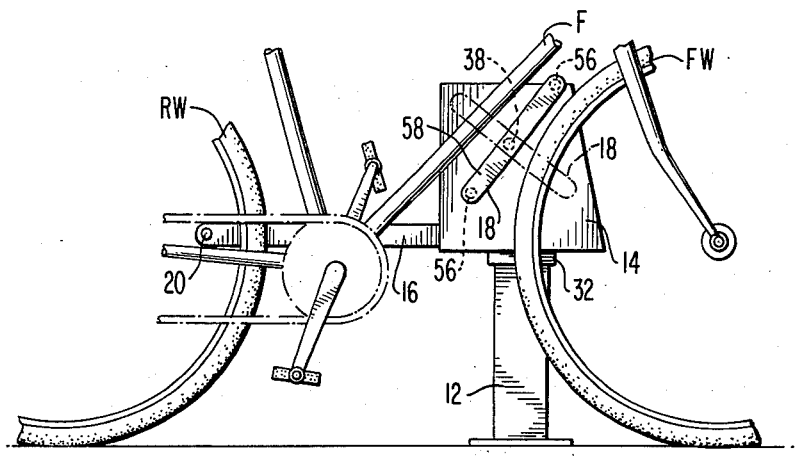
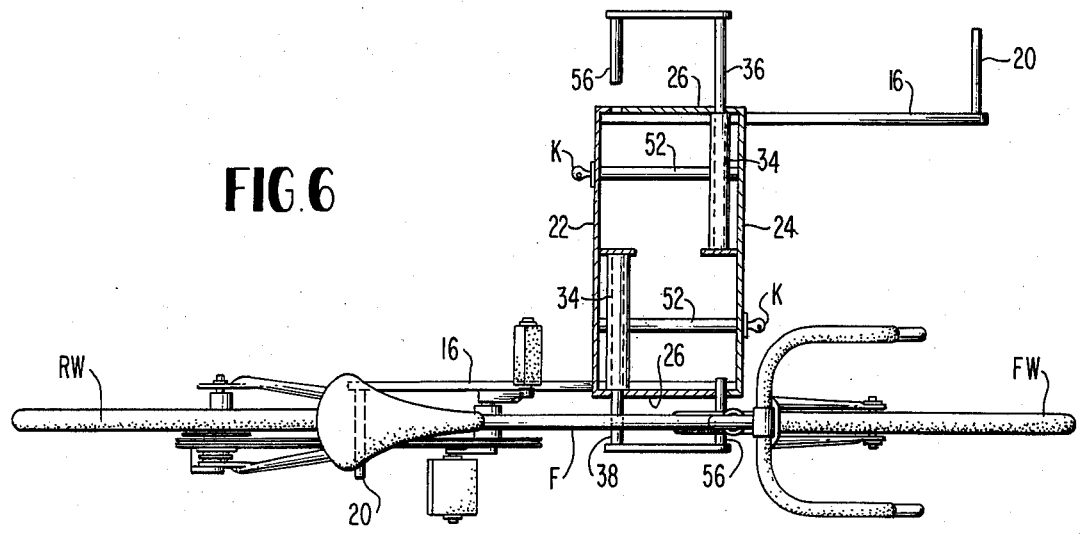

RACK AND BICYCLE LOCKING UNIT

BACKGROUND OF THE INVENTION

1. Field of the Invention

The present invention relates to a rack and locking unit for bicycles.

2. General Background

Bicycle racks with and without locking means comprise an art which has been with us for a long time. For example, back in 1898, David Bowman received U.S. Pat. No. 606,118 for a Combined Bicycle Lock and Holder. The device amounted to nothing more than a plate which is screw fastened to a wall from which two arms extend which are pivotably mounted to the plate. At the free end of each arm there is provided an arc-shaped finger. The fingers are displaceable to receive a frame bar of the bicycle. An elongated keeper encircles the arms and when moved to the arc-shaped finger end of the arms ensures that the fingers can not be separated. To retain the keeper in place to lock the fingers, a padlock is provided. This device was quite typical of those available at the time and for a long time thereafter. However, it is easy to see that unauthorized individuals can easily remove the bicycle if desired. The padlock or arms can be sawed, or the arc-shaped fingers can be forced apart. Then too, the wheels of the bicycle can be easily removed since they are not locked in any way. Such a device is therefore undesirable where a high degree of security is desired.

In recent years activity in this art has increased considerably due to the increasing use once again of the bicycle for recreational as well as transportation purposes. Unfortunately theft of bicycle and bicycle parts has also increased, so that many of the latest developed devices are directed to a solution of this problem. For example, U.S. Pat. Nos. 3,739,609, 3,762,569 and 3,783,659 are typical. Of these the device disclosed in the first patent is inadequate for one thing because the wheels are not secured. The device disclosed in the second patent is inadequate for one thing because only one wheel is secured. The device disclosed in the third patent does secure both wheels but is inadequate for one thing because the device disclosed is clumsy with respect to positioning and securing the bicycle.

It would therefore be desirable to have available a bicycle rack and locking unit which possesses design simplicity, has a high degree of security and can secure both wheels of the bicycle.

OBJECTS AND SUMMARY OF THE INVENTION

It is, therefore, an object of the present invention to provide the existing state of the art with a bicycle rack and locking unit which possesses design simplicity, has a high degree of security and can secure both wheels of the bicycle.

It is also an object of the present invention to provide the existing state of the art with a bicycle rack and locking unit where the locking mechanism is contained within and the locking bar is mounted to a single lock box.

It is also an object of the present invention to provide the existing state of the art with a bicycle rack and locking unit which utilizes a single lock box to secure two bicycles.

These and other objects are accomplished according to the present invention by the provision of a bicycle rack and locking unit which includes a pedestal, a lock box mounted on the pedestal and at least one arm member mounted to the lock box and extending in a direction substantially perpendicular to the pedestal. The lock box has at least one U-shaped or L-shaped locking bar which is mounted to the lock box for axial and pivotal movement relative thereto, and a locking mechanism therein which is actuatable externally of the lock box to lock and release the locking bar. The locking bar is readily displaced both axially and pivotably to lock both a wheel and a portion of the frame of a bicycle. The arm member has a shaft extending outwardly therefrom. This shaft passes through the other wheel of the bicycle and thereby prevents removal of the wheel from the bicycle frame.

Thus, the present state of the art has been significantly advanced to the point where it now includes a bicycle rack and locking unit which possesses design simplicity, has a high degree of security and can secure both wheels of the bicycle.

BRIEF DESCRIPTION OF THE DRAWING

FIG. 6 is a view similar to FIG. 2 illustrating another exemplary preferred embodiment of the present invention for locking two bicycles.

FIG. 7 illustrating the locking unit in the locked position (dashed lines) and in the unlocked position.

FIG. 8 illustrates the locking unit having a T-shaped member in the locked position (dashed lines) and in the unlocked position.

DESCRIPTION OF THE PREFERRED EMBODIMENTS

Figure 1:
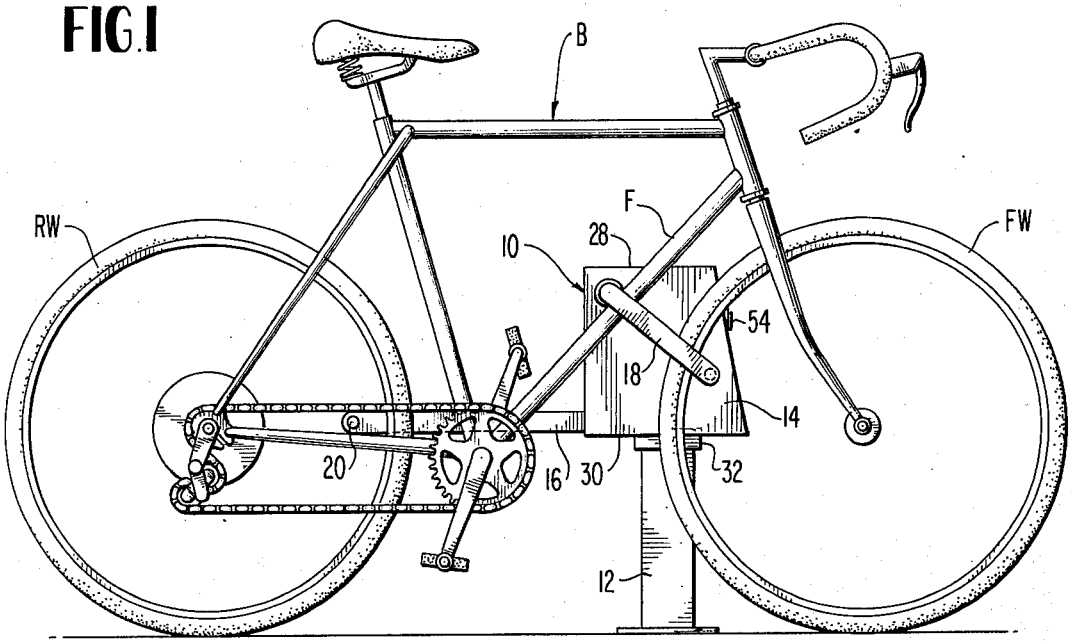
FIG. 1 schematically illustrates in side elevation, a view of the rack and bicycle locking unit according to the present invention with a bicycle in locked position.

A rack and locking unit 10 for a bicycle B comprises in its externally visible essential elements a pedestal 12, a lock box 14, and arm member 16, a generally U-shaped, L-shaped or even T-shaped member 18 and a shaft 20. The unit 10 can be installed permanently in any desired location. For example, it can be installed outside of one's home, outside of office buildings, outside of public buildings, in parking areas, such as in universities, airports, train stations, etc.

Preferably, the pedestal 12 has a tubular rectangular configuration, and is made of hardened steel. Its height above the ground to the point of attachment of the lock box 14 can be anywhere from 10 to 20 inches depending on the height of the bicycle frame to be secured. The lock 14 can be attached to the pedestal in any conventional manner, as, for example, by welding.

The lock box 14 is preferably rectangular in shape, being comprised of a front plate 22, a rear plate 24, side mounting plates 26, top plate 28 and bottom plate 30. These plates are preferably ¼ inch thick hardened steel plates which are preferably attached at their joining corners by welding. A socket 32 is preferably attached to the bottom plate 30 which defines a recess into which one end of the pedestal 12 is received for mounting the lock box 14. This configuration simplifies installation since the lock box 14 can be attached by welding to the pedestal 12 either at the site of manufacture or at the site of installation of the unit 10.

Figure 2:
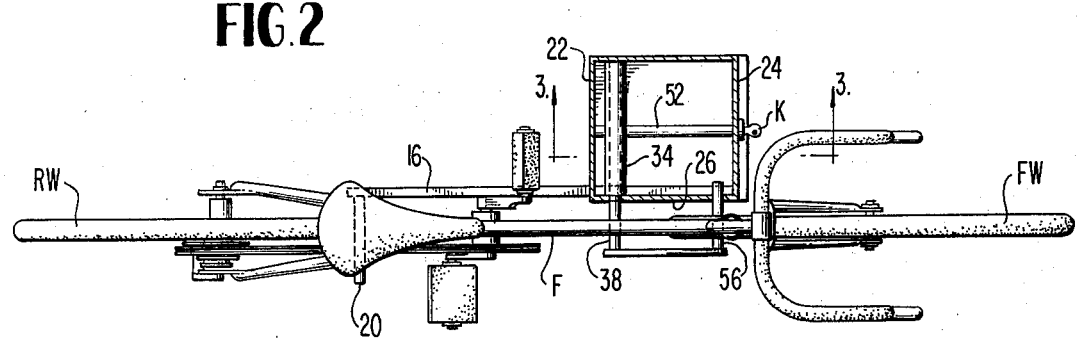
FIG. 2 is a top schematic view partly in cross section illustrating essential details of the locking elements and the lock box according to one exemplary preferred embodimemt of the present invention.
Figure 3:
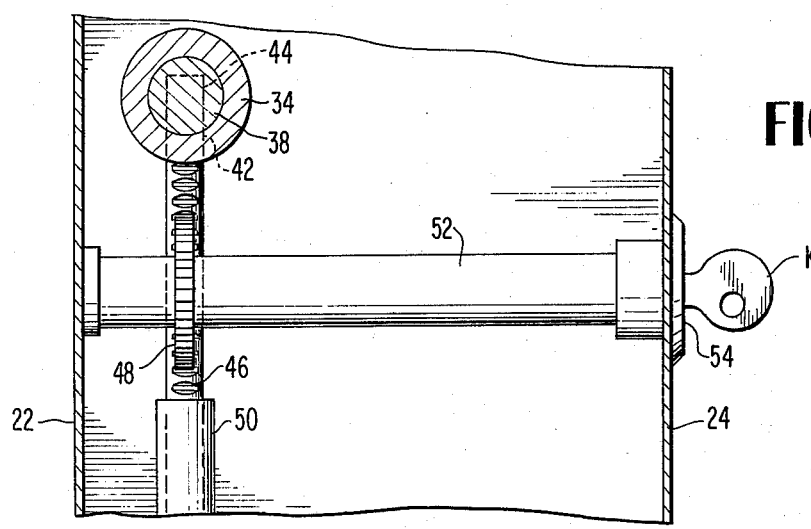
FIG. 3 is an enlarged view taken along the line 3—3 of FIG. 2.
Figure 4:
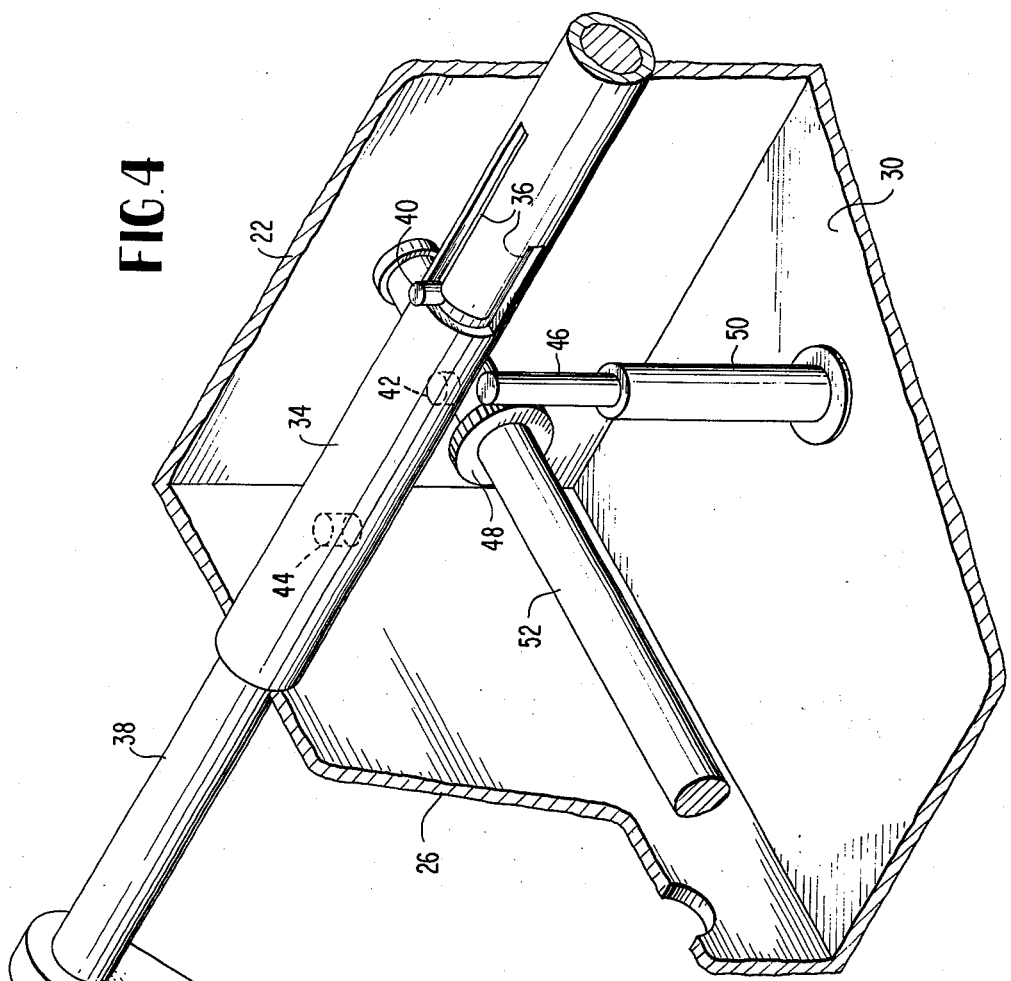
FIG. 4 is an enlarged perspective view of one exemplary embodiment of the locking bar means including the cylindrical sleeve, the generally U-shaped member and the delimiting means.
Figure 5:
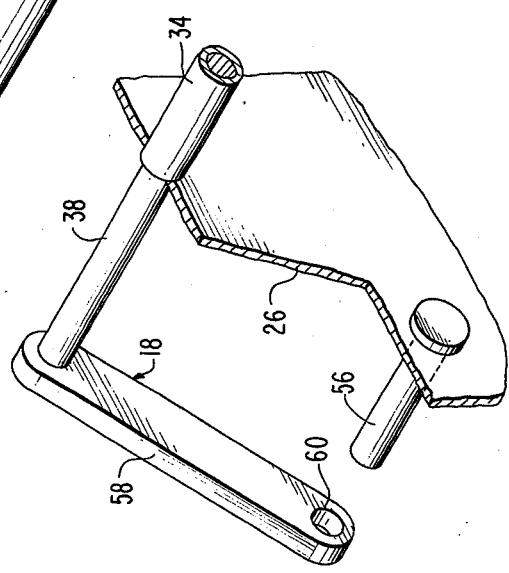
FIG. 5 is a limited view similar to a portion of FIG. 4 illustrating instead the generally L-shaped member.

Within the lock box 14 there is mounted, as shown in FIG. 2, a generally cylindrical sleeve 34 fixedly mounted between the side mounting plates 26. As shown in FIGS. 4 and 5, the sleeve 34 is provided with a generally U-shaped slotted track 36, whose purpose will be described more fully below. One leg 38 of a generally L-shaped member 18 (FIG. 5) is slidingly received within the sleeve 34. At one end of the leg 38 there is provided a pin 40 which extends outwardly from the leg 38, is received within and is guided by the slotted track 36. Both the sleeve 34 and the leg 38 are provided with slots 42 and 44, respectively. These slots can be aligned or brought into registry as shown in FIG. 3 for receiving one member of a lock to define thereby a motion prevention position.

The lock itself is configured as a rack 46 and pinion 48. The rack 46 serves as the member which is received within the aligned slots 42 and 44. The displacement of the rack 46 is of course effected by rotation of the pinion 48. A portion of the rack 46 is provided free of teeth and is slidably received within a support member 50. The member 50 is in turn mounted to the inside surface of the bottom plate 30. As shown in FIG. 3, the pinion 48 is mounted for rotation on a shaft 52, which is in turn mounted preferably between the front plate 22 and the rear plate 24. Exposed on the rear plate 24 is a key slot 54 for receiving therein a key K. Through the insertion of an authorized key K into the key slot 54, the shaft 52 and consequently the pinion 48 can be rotated so that the rack 46 can be displaced into and out of the aligned slots 42 and 44. Basically what is preferred is a coin operated arrangement similar to those associated with, for example, coin operated lockers found in airports, railroad stations, bus stations and the like. Such coin operated devices are available and need not therefore be discussed in detail. Of course a key alone would also be satisfactory. Also, it should be understood that the rack and pinion arrangement can be replaced by other and equivalent arrangements. For example, a spring and lever arrangement could be utilized according to which a spring would bias the member which would be received within the aligned slots 42 and 44 into a motion prevention position or lock position. To then achieve an unlocked position, an authorized key could be inserted into a key slot to which a lever is attached for pivoting the lever against the spring bias to thereby remove the member from within the aligned slots.

In the U-shaped configuration (FIG. 4), the member 18 is provided with another leg 56 which is received within an opening in the side plate 26, as shown most clearly in FIGS. 2 and 6. Alternatively, for the L-shaped configuration (FIG. 5), the end of the horizontal arm 58 is provided with a bore 60 which receives the free end of a member such as leg 56 which in this case is attached to and extends from the side plate 26.

When the unit 10 is not being used, it is preferably retained in the unlocked position. To operate the unit, an authorized key K is inserted in the key slot 54 so that the pinion 48 can be rotated in a direction permitting a displacement of the rack 46 out of the motion prevention position, i.e., out of the aligned slots 42 and 44. It is now possible to axially slide the member 36 relative to the sleeve 34 with the pin 40 sliding within one leg of the track 36. The member 18 is then pivoted into the position shown in FIG. 7. A bicycle B can now be placed as shown in FIG. 7 so that its frame portion F extends as shown and the pin 20 of the arm 16 extends through the spokes of the rear wheel RW. After the placement is completed, the member 18 is once again pivoted downwardly from the position shown in solid outline to the position shown in dashed outline in FIG. 7. Thereafter it is displaced axially inwardly so that the leg 38 moves inwardly relative to the sleeve 34 and the pin 40 moves along the track 36. In the U-shaped configuration the leg 56 has its free end received within the bore within the side plate 26, while in the L-shaped configuration, the free end of the member such as leg 56 is received within the bore 60. At this time, the slots 42 and 44 are in alignment and ready to receive the rack 46. An appropriate rotation of the pinion 48 by the key K will accomplish this end. In this locked position the key can be removed and relative movement of the leg 38 and the sleeve 34 is prevented so that removal of the bicycle including the front wheel FW is precluded. Also, because of the construction of the bicycle frame which mounts the rear wheel RW, the arm 16 and shaft 20 effectively preclude removal of this wheel as well.

Finally, the member 18 can be T-shaped as shown in FIG. 8. The member 18 includes a center leg 38, a pair of horizontal arms 58 and two legs 56. The T-shaped member functions in a similar manner to the U-shaped and L-shaped members.

Because the locking mechanism is totally encased within the lock box 16, it becomes difficult if not impossible for unauthorized personnel to unlock the member 18 and thereby remove the bicycle from the unit 10.

What is claimed is:

1. A bicycle rack and locking unit, comprising;
  a. a generally vertically extending pedestal;
  b. a lock box mounted to said pedestal; and
  c. at least one arm member mounted to said lock box and extending in a direction substantially perpendicular to said pedestal, wherein,
    said lock box includes mounting plate means, locking bar means pivotably mounted to said mounting plate means and displaceable relative thereto, and means within said lock box for locking said locking bar means to said mounting plate means, wherein,
    said locking bar means comprising a generally cylindrical sleeve mounted to said mounting plate means, a generally U-shaped member which is displaceable relative to said sleeve with one leg of said U-shaped member being received within said sleeve, and means delimiting the relative axial and rotational displacement of said U-shaped member relative to said sleeve, said delimiting means comprising a generally U-shaped slotted track formed in said sleeve, with said one leg of said U-shaped member having a pin extension which engages said track, wherein,
    said locking means are provided for locking said U-shaped member to said sleeve, and wherein,
    said arm member includes a shaft which extends outwardly from said arm member in the displacement direction of said locking bar means.

2. A bicycle rack and locking unit as defined in claim 1, wherein said locking means includes a first member which engages said one leg of said U-shaped member to thereby prevent the axial displacement thereof relative to said sleeve, and a second member which is actuatable externally of said lock box and displaces said first member into and out of the motion prevention position.

3. A bicycle rack and locking unit as defined in claim 2, wherein said first member is a rack and said second member is a pinion, and wherein said sleeve and said U-shaped member are provided with registering slots into which said rack is received to effect said motion prevention position.

4. A bicycle rack and locking unit as defined in claim 1, wherein the other leg of said U-shaped member has a length such that it is received within said lock box when the unit is locked and is displaced external to said lock box when the unit is unlocked.

5. A bicycle rack and locking unit, comprising:
 a. a generally vertically extending pedestal;
 b. a lock box mounted to said pedestal; and
 c. at least one arm member mounted to said lock box and extending in a direction substantially perpendicular to said pedestal, wherein,
  said lock box includes mounting plate means, locking bar means pivotably mounted to said mounting plate means and displaceable relative thereto, and means within said lock box for locking said locking bar means to said mounting plate means, wherein,
  said locking bar means comprising a generally cylindrical sleeve mounted to said mounting plate means, a generally L-shaped member which is displaceable relative to said sleeve with one leg of said L-shaped member being received within said sleeve, means delimiting the relative axial and rotational displacement of said L-shaped member relative to said sleeve, and shaft means mounted to said lock box to extend outwardly therefrom and engage the other leg of said L-shaped member when the unit is locked, said delimiting means comprising a generally U-shaped slotted track formed in said sleeve, with said one leg of said L-shaped member having a pin extension which engages said track, wherein,
  said locking means are provided for locking said L-shaped member to said sleeve, and wherein,
  said arm member includes a shaft which extends outwardly from said arm member in the displacement direction of said locking bar means.

6. A bicycle rack and locking unit as defined in claim 5, wherein said locking means includes a first member which engages said one leg of said L-shaped member to thereby prevent the axial displacement thereof relative to said sleeve, and a second member which is actuatable externally of said lock box and displaces said first member into and out of the motion prevention position.

7. A bicycle rack and locking unit as defined in claim 6, wherein said first member is a rack and said second member is a pinion, and wherein said sleeve and said one leg of said L-shaped member are provided with registering slots into which said rack is received to effect said motion prevention position.

8. A bicycle rack and locking unit, comprising:
 a. a generally vertically extending pedestal;
 b. a lock box mounted to said pedestal; and
 c. at least one arm member mounted to said lock box and extending in a direction substantially perpendicular to said pedestal, wherein,
  said lock box includes mounting plate means, locking bar means pivotably mounted to said mounting plate means and displaceable relative thereto, and means within said lock box for locking said locking bar means to said mounting plate means, wherein,
  said locking bar means comprising a generally cylindrical sleeve mounted to said mounting plate means, a generally T-shaped member which is displaceable relative to said sleeve with one leg of said T-shaped member being received within said sleeve, and means delimiting the relative axial and rotational displacement of said T-shaped member relative to said sleeve, and shaft means mounted to said lock box to extend outwardly therefrom and engages each of the other legs of said T-shaped member when the unit is locked, wherein,
  said locking means are provided for locking said T-shaped member to said sleeve, and wherein,
  said arm member includes a shaft which extends outwardly from said arm member in the displacement direction of said locking bar means.

9. A bicycle rack and locking unit as defined in claim 8, wherein said delimiting means comprises a generally U-shaped track formed in said sleeve, with said one leg of said T-shaped member having a pin extension which engages said track.

10. A bicycle rack and locking unit as defined in claim 9, wherein said locking means includes a first member which engages said one leg of said T-shaped member to thereby prevent the axial displacement thereof relative to said sleeve, and a second member which is actuatable externally of said lock box and displaces said first member into and out of the motion prevention position.

11. A bicycle rack and locking unit as defined in claim 10, wherein said first member is a rack and said second member is a pinion, and wherein said sleeve and said one leg of said T-shaped member are provided with registering slots into which said rack is received to effect said motion prevention position.

* * * * *